United States Patent
Karnam Venkat Naga et al.

(10) Patent No.: US 12,332,711 B2
(45) Date of Patent: Jun. 17, 2025

(54) SYSTEMS AND METHODS FOR MITIGATING PEAK CURRENT AND IMPROVING OVERALL PERFORMANCE

(71) Applicant: QUALCOMM INCORPORATED, San Diego, CA (US)

(72) Inventors: Srikar Karnam Venkat Naga, Bangalore (IN); Vandit Chauhan, Hyderabad (IN); Venkata Naga Satya Srinivas Nudurupati, Hyderabad (IN); Karimulla Syed, Bangalore (IN); Rohit Singh, Hyderabad (IN); Virat Deepak, San Diego, CA (US); Satyaki Mukherjee, Bangalore (IN); Ashok Kumar Immadi, Hyderabad (IN); Ronald Alton, Oceanside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 18/297,246

(22) Filed: Apr. 7, 2023

(65) Prior Publication Data
US 2024/0319773 A1    Sep. 26, 2024

Related U.S. Application Data

(60) Provisional application No. 63/492,131, filed on Mar. 24, 2023.

(51) Int. Cl.
*G06F 1/3206* (2019.01)
*G06F 1/26* (2006.01)
(Continued)

(52) U.S. Cl.
CPC .............. *G06F 1/3206* (2013.01); *G06F 1/26* (2013.01); *G06F 1/324* (2013.01); *G06F 1/3243* (2013.01)

(58) Field of Classification Search
CPC ..... G06F 1/26; G06F 1/28; G06F 1/30; G06F 1/3203; G06F 1/3206; G06F 1/324;
(Continued)

(56) References Cited

U.S. PATENT DOCUMENTS

2013/0046999 A1    2/2013  Jung
2015/0198660 A1    7/2015  Dhanwada et al.
(Continued)

FOREIGN PATENT DOCUMENTS

WO    WO-2024205720 A1 *  10/2024  ............... G06F 1/26

OTHER PUBLICATIONS

Related PCT App. Ser. No. PCT/US2024/013568, Filed on Jan. 30, 2024, entitled, "Systems and Methods for Mitigating Peak Current and Improving Overall Performance," International Search Report & Written Opinion (EPO), report dated May 10, 2024, 12pages.

*Primary Examiner* — Thomas J. Cleary
(74) *Attorney, Agent, or Firm* — Smith Tempel Blaha LLC/Qualcomm

(57) ABSTRACT

A system for performing peak current mitigation in an application programming subsystem (APSS) dynamically performs mitigation based at least in part on power rail voltage and leakage current obtained at boot time. The voltage and leakage current obtained at boot time are used to estimate peak current. A map that is generated prior to boot time maps estimated peak current to throttling level and dictates different levels of throttling to be performed for different ranges of estimated peak current. At boot time, the map is used to map the estimated peak current to a level of throttling to be applied. If conditions at run time indicate that peak current is occurring or is likely to occur soon, the mapped level of throttling is applied to mitigate the peak current.

30 Claims, 8 Drawing Sheets

(51) Int. Cl.
*G06F 1/3234* (2019.01)
*G06F 1/324* (2019.01)

(58) Field of Classification Search
CPC .............. G06F 1/3243; G06F 11/3024; G06F 11/3058; G06F 11/3062; G06F 1/3296
See application file for complete search history.

(56) References Cited

U.S. PATENT DOCUMENTS

| | | |
|---|---|---|
| 2016/0070327 A1* | 3/2016 | Nemani ................ G06F 1/3206 |
| | | 713/300 |
| 2016/0294374 A1* | 10/2016 | Gemma ................. H03K 5/135 |
| 2018/0349191 A1* | 12/2018 | Dorsey ................. G06F 9/5044 |
| 2020/0363860 A1* | 11/2020 | Ananthakrishnan ......................... |
| | | G06F 9/3891 |
| 2021/0042875 A1* | 2/2021 | Meixner ............. G06F 9/30038 |
| 2023/0176645 A1* | 6/2023 | Wu ........................... G06F 1/28 |

\* cited by examiner

SYSTEMS AND METHODS FOR MITIGATING PEAK CURRENT AND IMPROVING OVERALL PERFORMANCE

DESCRIPTION OF THE RELATED ART

A computing device may include multiple processor-based subsystems. Such a computing device may be, for example, a portable computing device ("PCD"), such as a laptop or palmtop computer, a cellular telephone or smartphone, portable digital assistant, portable game console, etc. Still other types of PCDs may be included in automotive and Internet-of-Things ("IoT") applications.

The multiple subsystems may be included within the same integrated circuit chip or in different chips. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other subsystems, such as a transceiver or "modem" subsystem that provides wireless connectivity, a memory subsystem, etc.

Processors of SoCs such as CPUs, GPUs and DSPs, for example, sometimes experience temperature increases due to external environmental factors and/or due to internal factors. Current SoCs often employ one or more temperature sensors that sense temperature and output temperatures values. Thermal management circuits employed in the SoC process the temperature values and perform thermal mitigation processes that mitigate these temperature increases.

SoCs often have an application processor subsystem (APSS) that includes multiple clusters of application processors. For example, an APSS can include a performance cluster comprising two to four application processors that are configured for high performance and a power cluster comprising two to four application processors that are configured to be efficient in terms of power consumption. Each of the processors has its own clock. The processors of the performance cluster operate at higher clock frequencies than the processors of the power cluster. The processors of the power cluster are more efficient in terms of power usage than the processors of the performance cluster. The CPU of the SoC can be one of these application processors or it can be a separate processor.

One technique for reducing the costs of SoCs is to use aggressive sizing optimization for the power grid of the SoC. One way to achieve this is to have the processors of the power and performance clusters share the same supply voltage rail of the power grid. In such designs, it can be a challenge to meet the power budget or power constraints of the SoC, particularly when all of the cores are active and are operating at maximum clock frequency.

Traditional peak current mitigation solutions detrimentally impact performance and are not always capable of ensuring that the power budget is not exceeded, especially in cases in which multiple processor clusters share the same supply voltage rail. A need exists for a peak current mitigation solution that ensures that the power budget is not exceeded while also reducing the detrimental impact on performance that traditional peak current mitigation solutions cause.

SUMMARY OF THE DISCLOSURE

Systems, methods, and other examples are disclosed for performing peak current mitigation in an application program subsystem (APSS).

An exemplary embodiment of the method for performing peak current mitigation in an application program subsystem (APSS) comprises:
   at boot time of the APSS, obtaining voltage and leakage current values of a power grid rail to which the APSS is electrically coupled, using the obtained voltage and leakage current values to estimate a peak current value range of the APSS, and using a preconfigured estimated peak current value range-to-throttling level map to map the estimated peak current value range to a throttling level to be performed; and
   at run time of the APSS, if conditions indicate that the APSS is operating at or near peak current, causing the mapped throttling level to be applied to at least one processor of the APSS.

An exemplary embodiment of an application processing subsystem (APSS) configured to perform peak current mitigation comprises:
   at least one processor; and
   an APSS controller comprising:
      boot time voltage and leakage current obtention logic configured to obtaine, at boot time of the APSS, voltage and leakage current values of a power grid rail to which the APSS is electrically coupled;
      boot time peak current estimation logic configured to use the obtained voltage and leakage current values at boot time of the APSS to estimate a peak current value range of the APSS and to use a preconfigured estimated peak current value range-to-throttling level map to map the estimated peak current value range to a throttling level to be performed; and
      run time mitigation logic configured to cause the mapped throttling level to be applied to said at least one processor of the APSS if conditions indicate that the APSS is operating at or near peak current.

An exemplary embodiment of a non-transitory computer-readable medium comprising computer instructions for execution by an APSS for performing peak current mitigation in the APSS comprises:
   a first set of computer instructions for execution at boot time of the APSS for obtaining voltage and leakage current values of a power grid rail to which the APSS is electrically coupled;
   a second set of computer instructions for execution at boot time of the APSS using the obtained voltage and leakage current values to estimate a peak current value range of the APSS;
   a third set of computer instructions for execution at boot time of the APSS for using a preconfigured estimated peak current value range-to-throttling level map to map the estimated peak current value range to a throttling level to be performed; and
   a fourth set of computer instructions for execution at run time of the APSS if conditions indicate that the APSS is operating at or near peak current, wherein execution of the fourth set of computer instructions causes the mapped throttling level to be applied to at least one processor of the APSS.

Another exemplary embodiment of an APSS for performing peak current mitigation comprises:
   at least one processor; and
   an APSS controller comprising:
      means for obtaining, at boot time of the APSS, voltage and leakage current values of a power grid rail to which the APSS is electrically coupled;

means for using, at boot time, the obtained voltage and leakage current values at boot time of the APSS to estimate a peak current value range of the APSS;

means for using, at boot time, a preconfigured estimated peak current value range-to-throttling level map to map the estimated peak current value range to a throttling level to be performed; and means for causing, at run time, the mapped throttling level to be applied to said at least one processor of the APSS if conditions indicate that the APSS is operating at or near peak current.

These and other feature and advantages will become apparent from the following description, drawings and claims.

BRIEF DESCRIPTION OF THE DRAWINGS

In the Figures, like reference numerals refer to like parts throughout the various views unless otherwise indicated. For reference numerals with letter character designations such as "101a" or "101b", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

Figure 1:
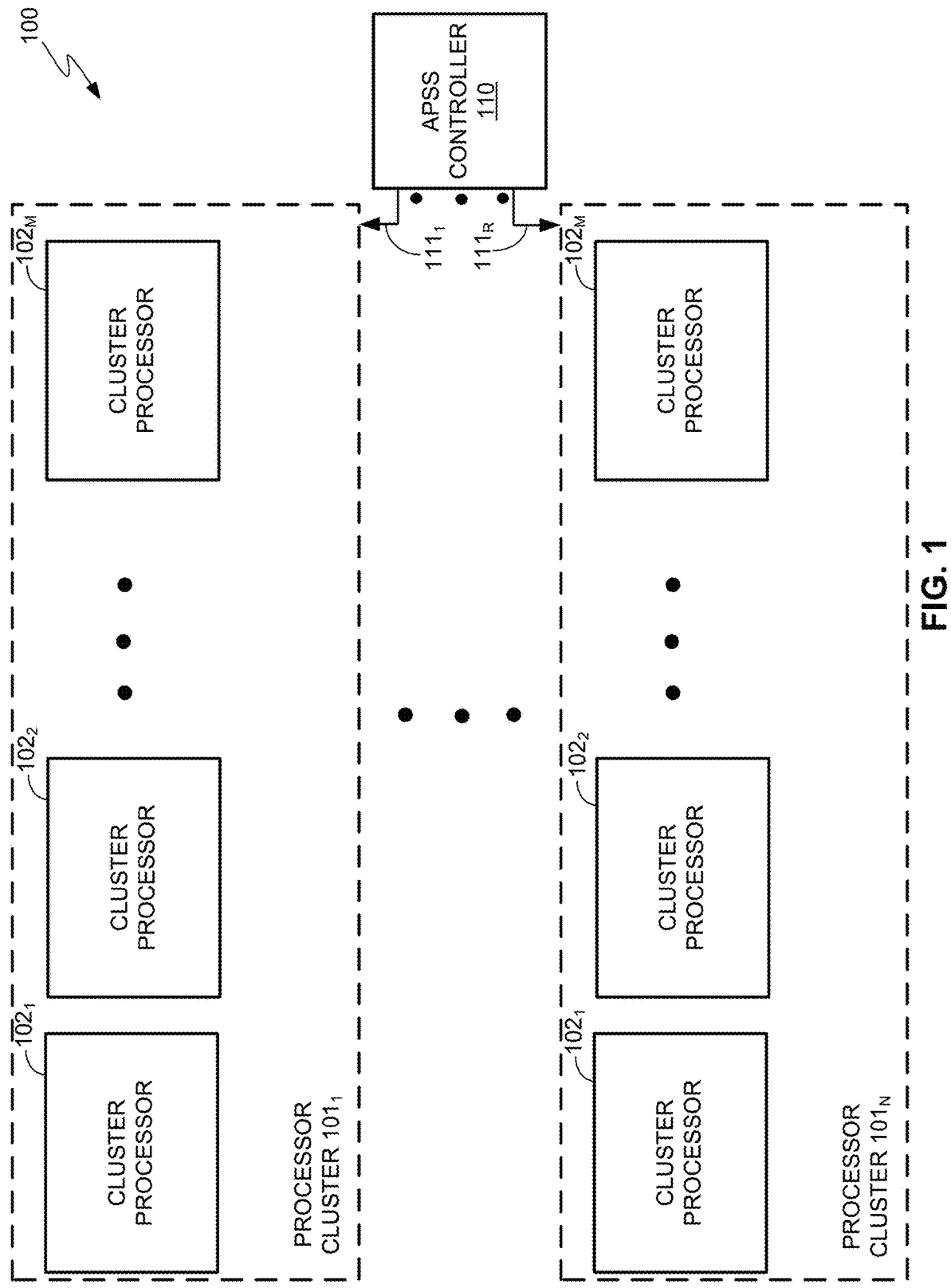
FIG. 1 is a block diagram of an application program subsystem (APSS) in accordance with a representative embodiment that can be embedded in, for example, an SoC of a PCD, although the inventive principles and concepts are not limited in regard to the types of devices in which the inventive principles and concepts are employed.

Existing peak current mitigation solutions perform mitigation algorithms that attempt to reduce peak current, either by performing frequency throttling to reduce the operating frequency of the processors or by performing microarchitectural throttling to reduce the number of instructions that are executed per clock cycle by the processors. However, such solutions are not customized to the specific SoC, but are configured uniformly across the entire volume of SoCs of a particular design, or model. Such throttling solutions are static in that they do not dynamically adapt to each specific SoC. As a result, some SoCs of the volume are throttled even when there is no need to perform throttling, or at least not at the level being applied. Such throttling solutions detrimentally impact performance. Consequently, the performance of many of the SoCs of the volume of SoCs is being unnecessarily detrimentally impacted, either because throttling is being performed when there is no need to perform throttling or because the level of throttling applied is greater than necessary.

The present disclosure discloses systems and methods for dynamically performing mitigation based at least in part on power rail voltage and leakage current obtained at boot time. The supply voltage and leakage current are used at boot time to estimate peak current. Leakage current is a component of total current: Total Current=Dynamic Current (dependent on Voltage/Freq)+Leakage current. Leakage per part can vary. The leakage current is a quiescent current that flows in the supply voltage rail when the processors of the clusters are on, but are inactive. Dynamic current is dependent on operating voltage, frequency and a certain amount of activity of one or more of the processors of one or more of the clusters. In accordance with an exemplary embodiment, the leakage current is determined for the specific SoC during an offline bench test method, fused, or programmed, into a register of the SoC, and read from the register at boot time. The supply voltage can vary with time and temperature and is therefore measured or sensed at boot time.

A map that is generated prior to boot time maps estimated peak currents to throttling levels and dictates different levels of throttling to be performed for different ranges of estimated peak current. At boot time, the map is used to map the estimated peak current to a level of throttling to be applied. If conditions at run time indicate that peak current is occurring or is likely to occur soon, the mapped level of throttling is applied to mitigate the peak current.

Because the systems and methods according to the inventive principles and concepts are applied on a per-part, i.e., per-SOC, basis, unnecessary throttling is avoided, which results in a reduction in the detrimental impact on performance that throttling can cause. Also, because mitigation is not performed uniformly across all SoCs of the volume of SoCs manufactured, many SoCs of the volume will remain unthrottled and therefore will never suffer performance degradation due to throttling.

In the following detailed description, for purposes of explanation and not limitation, exemplary, or representative, embodiments disclosing specific details are set forth in order to provide a thorough understanding of an embodiment according to the present teachings. The word "exemplary" is used herein to mean "serving as an example, instance, or illustration." The word "representative" may be used herein synonymously with "exemplary." Any aspect described herein as "exemplary" is not necessarily to be construed as preferred or advantageous over other aspects. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or more memory devices. The memory may, for example, be multiple memories within the same computer system. The memory may also be multiple memories distributed amongst multiple computer systems or computing devices.

A "processor", as that term is used herein encompasses an electronic component that is able to execute a computer program or executable computer instructions. References herein to a system comprising "a processor" should be interpreted as one or more processors. The processor may for instance be a multi-core processor comprising multiple processing cores, each may comprise multiple processing stages of a processing pipeline. A processor may also refer to a collection of processors within a single computer system or distributed amongst multiple computer systems.

A "controller", as that term is used herein, encompasses an electronic component that is able to execute a computer program or executable computer instructions in order to perform specific tasks, as well as a hardware component comprising one or more state machines having combinational logic configured to perform certain tasks. For example, a controller can be a processor, such as a microprocessor, or some other type of processor, such as a DSP. References herein to a "controller" should be interpreted as one or more controllers.

A computing device may include multiple subsystems, cores or other components. Such a computing device may be, for example, a PCD, such as a laptop or palmtop computer, a cellular telephone or smartphone, a portable digital assistant, a portable game console, an automotive safety system of an autonomous driving vehicle, a server chip, etc.

FIG. 1 is a block diagram of an application program subsystem (APSS) 100 in accordance with a representative embodiment that can be embedded in, for example, an SoC of a PCD, although the inventive principles and concepts are not limited in regard to the types of devices in which the inventive principles and concepts are employed. In accordance with this representative embodiment, the system 100 comprises N processor clusters $101_1$-$101_N$, each of which comprises M processors $102_1$-$102_M$ and an APSS controller 110, where N is a positive integer that is greater than or equal to two and M is a positive integer that is greater than or equal to one. The APSS controller 110 is configured to output control signals $111_1$-$111_R$ to the processor $102_1$-$102_M$ of the clusters $101_1$-$101_N$ that cause an adaptive peak current mitigation process to be performed that is customized to the SoC and that adapts to conditions occurring at boot time and at run time, where R is equal to M×N.

Figure 2:
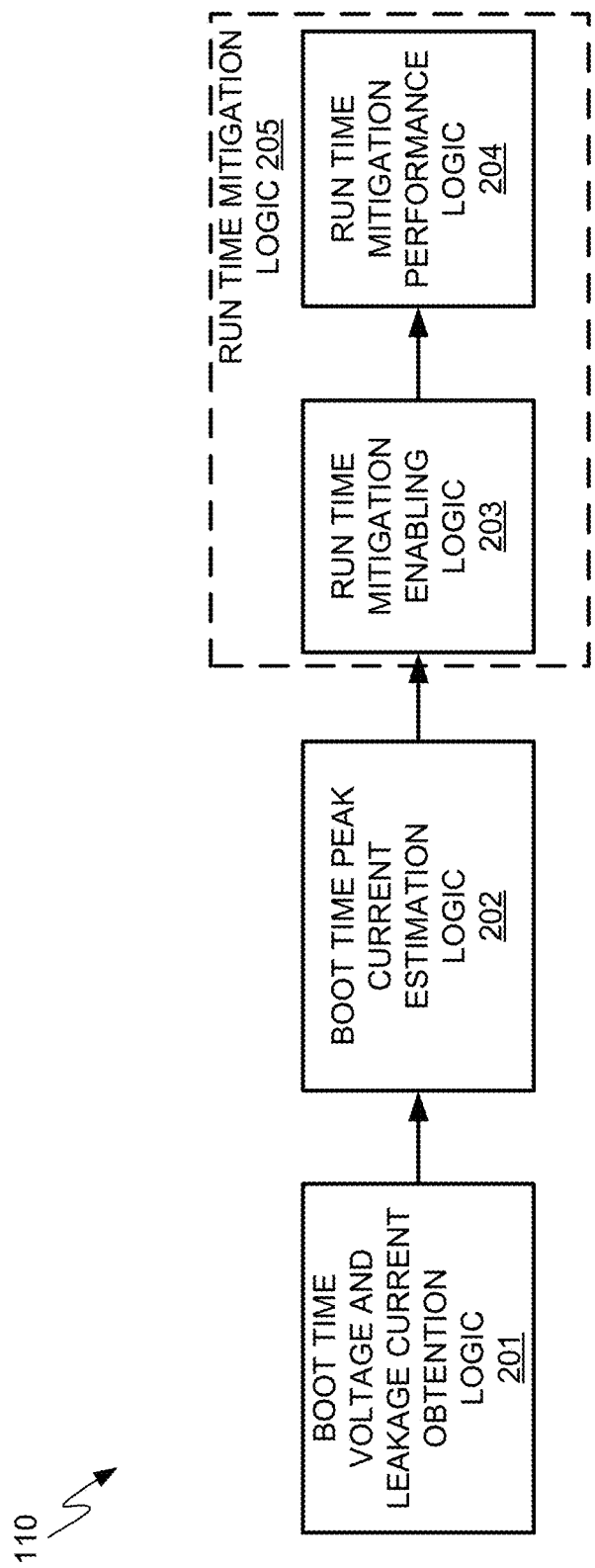
FIG. 2 is a block diagram of the APSS controller of the APSS shown in FIG. 1 in accordance with a representative embodiment.

FIG. 2 is a block diagram of the APSS controller 110 of the APSS 100 shown in FIG. 1 in accordance with a representative embodiment. When the SoC comprising the controller 110 boots up, boot time voltage and leakage current obtention logic 201 of the controller 110 reads, measures, calculates or otherwise obtains values for the supply voltage and leakage current of the shared supply voltage rail (not shown) to which the clusters $101_1$-$101_N$ are electrically coupled. These values are used by boot time peak current estimation logic 202 of the APSS controller 110 to estimate the peak current value range. The term "peak current," as that term is used herein, is "Total Current" in the equation above and is the current flowing in the power rail to which the APSS 100 and clusters $101_1$-$101_N$ are electrically coupled with all processors $102_1$-$102_M$ of all clusters $101_1$-$101_N$ active and operating at their maximum clock frequencies.

The boot time peak current value range estimation logic 202 exports the estimated peak current value range to run time mitigation logic 205. Run time mitigation enabling logic 203 of the run time mitigation logic 205 comprises a preconfigured mapping of estimated peak current value ranges to values for different levels of throttling, preferably implemented as a lookup table (LuT) in the logic 203. This mapping is used to map the exported estimated peak current value range to a level of throttling to be performed. The run time mitigation enabling logic 203 uses this mapping to select a level of throttling to be performed to reduce peak current and then informs run time mitigation performance logic 204 of the level of throttling to be performed at times when peak current is occurring or is likely to occur. The range of levels can include a lowest level for which the run time mitigation enabling logic 203 and run time mitigation performance logic 204 remain disabled because no throttling is needed as well as intermediate and/or higher levels of throttling corresponding to at least some level of throttling being performed to reduce peak current, as will now be described with reference FIG. 3.

Figure 3:
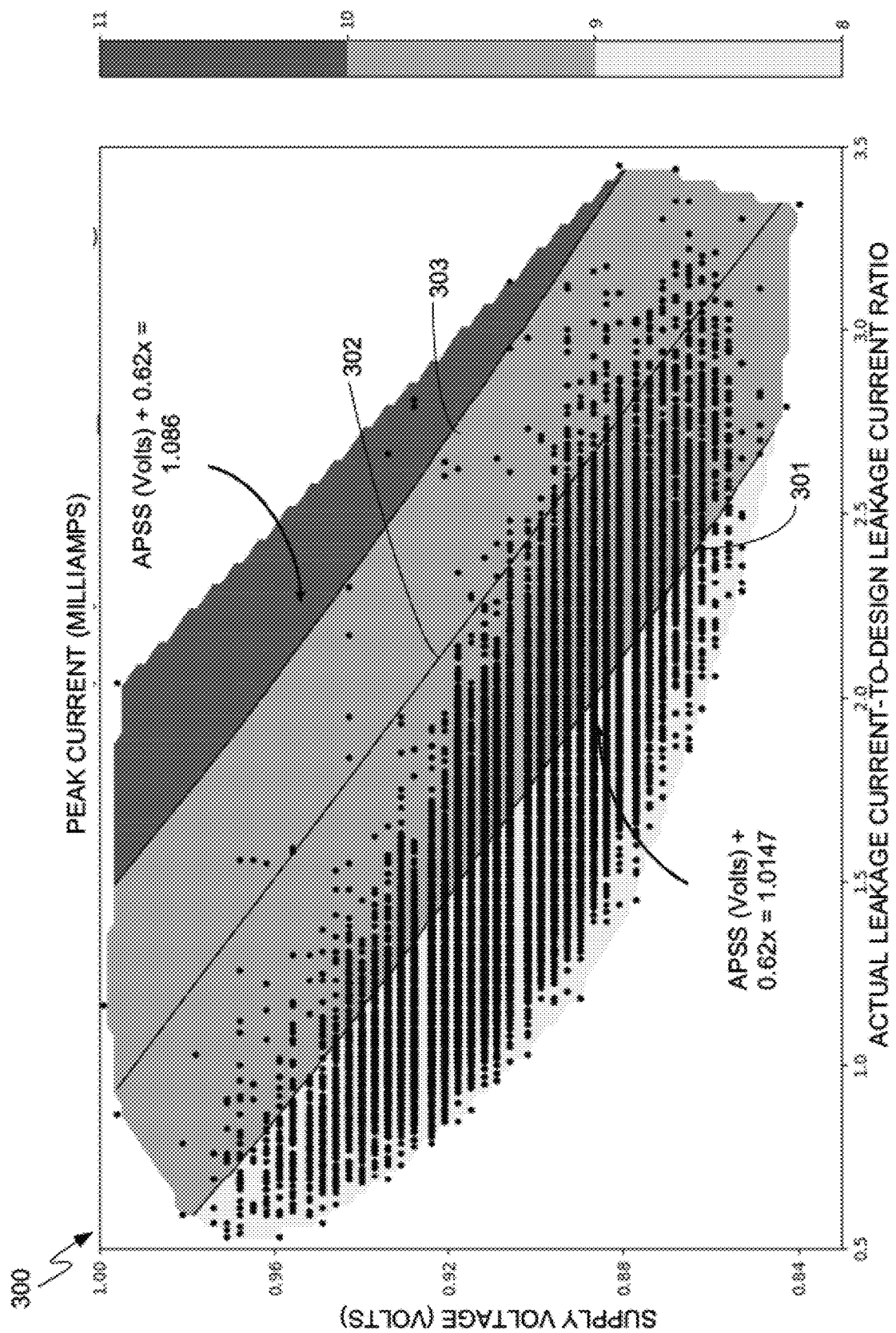
FIG. 3 is a plot of peak current of the APSS shown in FIG. 1 as a function of supply voltage and the ratio of the actual leakage current of the APSS to the leakage current obtained by modeling the SoC design in which the APSS is implemented.

FIG. 3 is a plot 300 of peak current of the APSS 100 of an SoC as a function of supply voltage and the ratio of the actual leakage current of the APSS 100 to the leakage current obtained by modeling the SoC design. The data used in the plot 300 was obtained through post-production collection and analysis of data from a plurality of SoCs yielded from the same production lot or batch. Through process binning of this data, three mathematical equations were obtained that express the relationship between supply voltage, the leakage current ratio and peak current. These equations represent conditions that allow four different regions of the plot 300 to be distinguished from one another, namely, the region below line 301, the region in between lines 301 and 302, the region in between lines 302 and 303, and the region above line 303:

$$\text{APSS\_Voltage (Volts)} + k_1 * \frac{\text{Part leakage (mA)}}{\text{Design leakage estimate (mA)}} < TH_1 \quad \text{Eq. 1}$$

$$\text{APSS\_Voltage (Volts)} + k_2 * \frac{\text{Part leakage (mA)}}{\text{Design leakage estimate (mA)}} < TH_2 \quad \text{Eq. 2}$$

$$\text{APSS\_Voltage (Volts)} + k_3 * \frac{\text{Part leakage (mA)}}{\text{Design leakage estimate (mA)}} < TH_3 \quad \text{Eq. 3}$$

where $k_1$, $k_2$ and $k_3$ are constants, APSS_Voltage is the supply voltage of the rail of the power grid to which clusters $101_1$-$101_N$ and the APSS controller 110 are electrically coupled, Part leakage is the actual leakage current of the power grid, Design leakage estimate is the leakage current of the power grid estimated using the model of the SoC design, $TH_1$, $TH_2$ and $TH_3$ are first, second and third threshold (TH) values, respectively, and $TH_1 < TH_2 < TH_3$.

For the data that was used to generate plot 300, Equations 1 and 3, which correspond to lines 301 and 303, respectively, in the plot 300 are given as APSS (Volts)+0.62x=1.0147 and APSS (Volts)+0.60x=1.086, respectively. Thus, in this example, $k_1$=0.62, $k_3$=0.60, $TH_1$=1.0147 and $TH_3$=1.086. The TH values are selected based on the power budget or power grid constraints for the power grid to which the APSS 100 is electrically coupled and based on the level of throttling that is believed to be warranted for different ranges of the peak current value. Therefore, the TH values and the constants k that are used in the equations will depend on the particular SoC design. For this example, it was determined that: (1) no throttling is needed if the peak current is less than 9.0 A; (2) about 10% throttling is needed if the peak current is greater than or equal to 9.0 A and less than 9.5 A; (3) about 15% to 20% throttling is needed if the peak current is greater than or equal to 9.5 A and less than 10.0 A; and (4) about 20% to 25% throttling is needed if the peak current is greater than or equal to 10.0 A. The TH values of 1.0147 and 1.086 for $TH_1$ and $TH_3$, respectively, and the constants $k_1$ and $k_3$ were selected based on the data that was used to generate the plot 300. Although Equation 2 not shown in the plot 300 for case of illustration and discussion, the values for $k_2$ and $TH_2$ are selected in the same way.

For the example volume of SoCs that were used to collect and analyze the data that was used to generate plot 300, 10% throttling resulted in about a 5% reduction in peak current, 15 to 20% throttling resulted in about a 10% reduction in peak current, and 20 to 25% throttling resulted in about a 15% reduction in peak current. In this context, the percentage of throttling (e.g., 10%) being performed means that either (1) frequency throttling is being used to reduce the operating frequency of the processors by that percentage (e.g., to reduce the operating frequency by 10%) or (2) microarchitectural throttling is being used to reduce the number of instructions that are being executed by the cores of the processors during a clock cycle or a series of clock cycles by that percentage (e.g., 10% fewer instructions are being executed by inserting idle instructions into the processing pipelines). In most cases, microarchitectural throttling will be used without frequency throttling because a faster response time can be achieved using microarchitectural throttling than can be achieved using frequency throttling.

It should be noted that the number of equations used to distinguish different regions of the plot 300 can be any number greater than or equal to one. The greater the number of equations that are used for this purpose, the greater granularity in levels of throttling that are employed, which leads to greater granularity in the levels of peak current reduction.

Once the equations above and the corresponding TH and k values are determined in the manner described above with reference to FIG. 3, these values are stored in a memory device of the APSS controller 110 or in a memory device that is external to, but accessible by, the APSS controller 110. With reference again to FIG. 2, when the APSS 100 is booted up, the boot time voltage and leakage current obtention logic 201 obtains the supply voltage and leakage current values. The boot time peak current estimation logic 202 then uses the voltage and leakage current values in combination with the TH and k values stored in memory in Equations 1-3, or in a similar set of equations obtained in the same or similar manner, to estimate the peak current value range.

For example, assuming for case of discussion that only Equations 1 and 3 are used and that the values for $k_1$=0.62, $k_3$=0.60, $TH_1$=1.0147 and $TH_3$=1.086 are used, the logic 202 determines whether the sum on the left side of Equation 1 is less than 1.0147. If so, the logic 202 estimates the peak current to be less than 9.0 A and therefore logic 202 does not enable the run time mitigation enabling logic 203. Preferably, the default states of the run time mitigation enabling logic 203 and the run time mitigation performance logic 204 are the disabled states, in which no throttling is performed at run time.

If the boot time current estimation logic 202 determines that the sum on the left side of Equation 1 is not less than $TH_1$=1.0147, the logic 202 determines whether the sum on the left side of Equation 3 is less than $TH_3$=1.086. If not, the logic 202 estimates the peak current value to be greater than 10.0 A. The logic 202 then enables the run time mitigation enabling logic 203, which enables the run time mitigation performance logic 204 and informs it that 20% to 25% throttling is needed at run time to sufficiently reduce peak current. At run time, the run time mitigation performance logic 204 determines whether certain conditions indicate that throttling is warranted, and if so, causes 20% to 25% throttling to be performed. These "certain conditions" are described below in more detail with reference to FIG. 6.

If the logic 202 determines that the sum on the left side of Equation 1 is not less than $TH_1$=1.0147 and that the sum on the left side of Equation 3 is less than $TH_3$=1.086, then the boot time current estimation logic 202 estimates the peak current value to be somewhere in between 9 A and 10 A and enables the run time mitigation enabling logic 203, which enables the run time mitigation performance logic 204 and instructs it to perform 10% to 20% throttling. The run time mitigation performance logic 204 determines whether certain conditions indicate that throttling is warranted, and if so, causes 10% to 20% throttling to be performed.

In accordance with an exemplary embodiment, the logic blocks 201-204 are implemented in hardware, such as in one or more state machines, for example. It should be noted, however, that the logic shown in FIG. 2 can be implemented in hardware, software, firmware, or any combination thereof.

As described above, preferably a mapping of the peak current estimate range to the level of throttling that is to be performed at run time will be implemented with a LuT. For example, the result of Eq. 1 is used to generate an address in the LuT at which the corresponding throttling level to be performed is stored. In other words, if the sum of the left side of Eq. 1 is less than $TH_1$, the corresponding address in the LuT will contain a value indicating that no throttling is to be performed, whereas if the sum of the left side of Eq. 1 is greater than or equal to $TH_1$, the corresponding address in the LuT will contain a value indicating that a particular level of throttling, or range of throttling levels, is to be performed.

Figure 4:
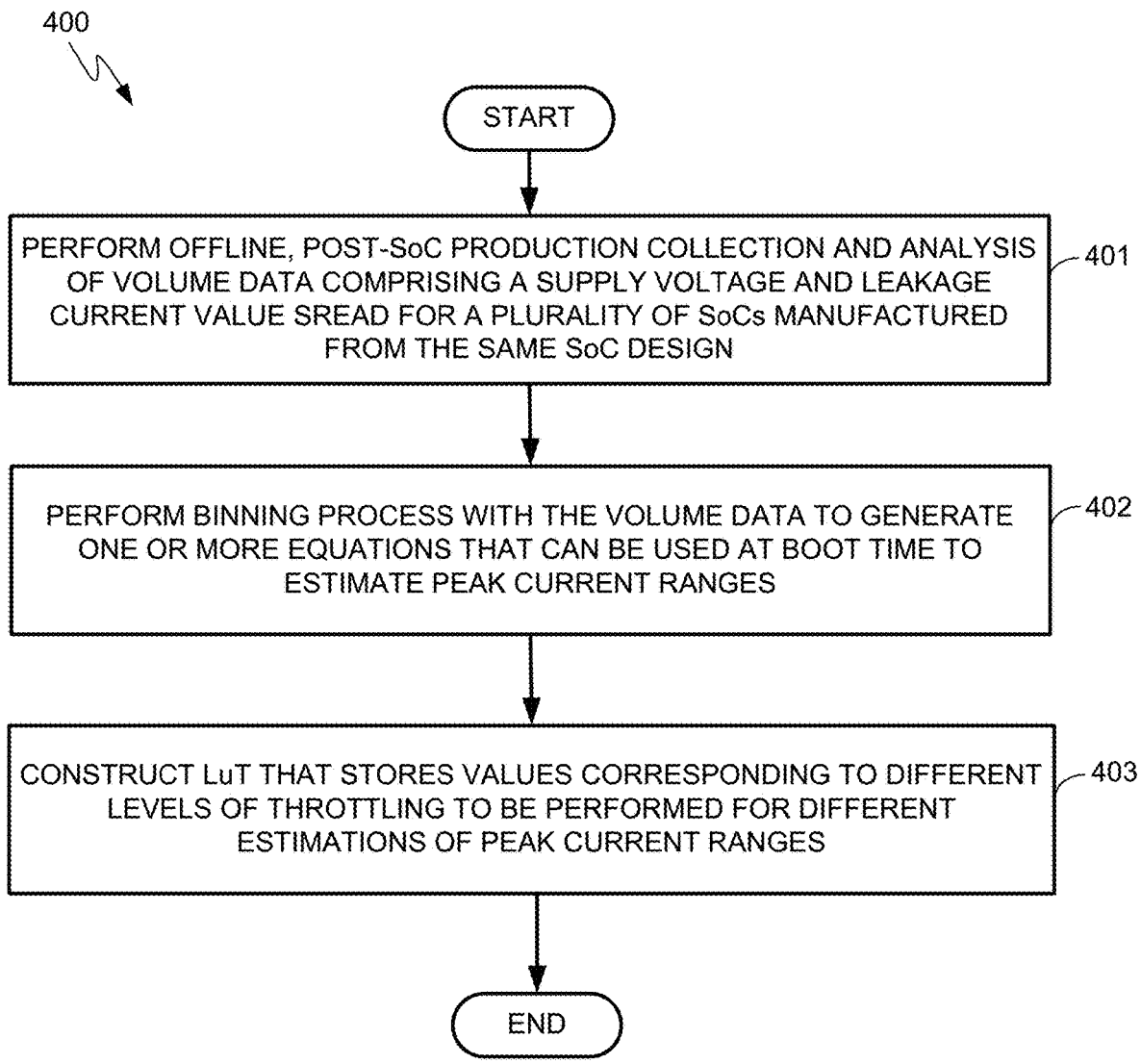
FIG. 4 is a flow diagram of the process described with reference to FIG. 3 of generating the values that are stored in a LuT and that will be used at run time to perform peak current mitigation to reduce peak current.

FIG. 4 is a flow diagram of the process 400 described above with reference to FIG. 3 of generating the values that are stored in the LuT and that will be used at run time to perform peak current mitigation to reduce peak current. The process 400 is a post-production process that is performed offline and can be, for example, a cloud-based analysis. Block 401 represents the process of post-production collection and analysis of volume data comprising a spread of voltage and leakage current values for a plurality of SoCs having the same design, and preferably yielded from the same production lot or batch. Block 402 represents a binning process that uses this volume data to obtain one or more mathematical equations of the type described above with reference to FIG. 3 that can be used to estimate the peak current value range at boot time. Block 403 represents the process of constructing the LuT having addresses at which are stored different levels of throttling to be performed based on the results of performing the one or more equations, i.e., based on different estimations of peak current value range made at boot time. Essentially, the results of the one or more equations produced at boot time are used at run time to generate addresses of the LuT from which different values corresponding to different levels of throttling are retrieved. For example, if the results of Equations 1 and 2 are that the peak current is estimated to be between 9.0 A and 9.5A, that results in a particular address being generated that is used to address the LuT at run time to retrieve the associated throttling level. The level of throttling retrieved from the LuT is then performed if run time conditions indicate that the APSS 100 is operating at peak current or is likely to be operating at peak current soon (e.g., within the next few clock cycles), as will be described below in more detail with reference to FIG. 6.

Figure 5:
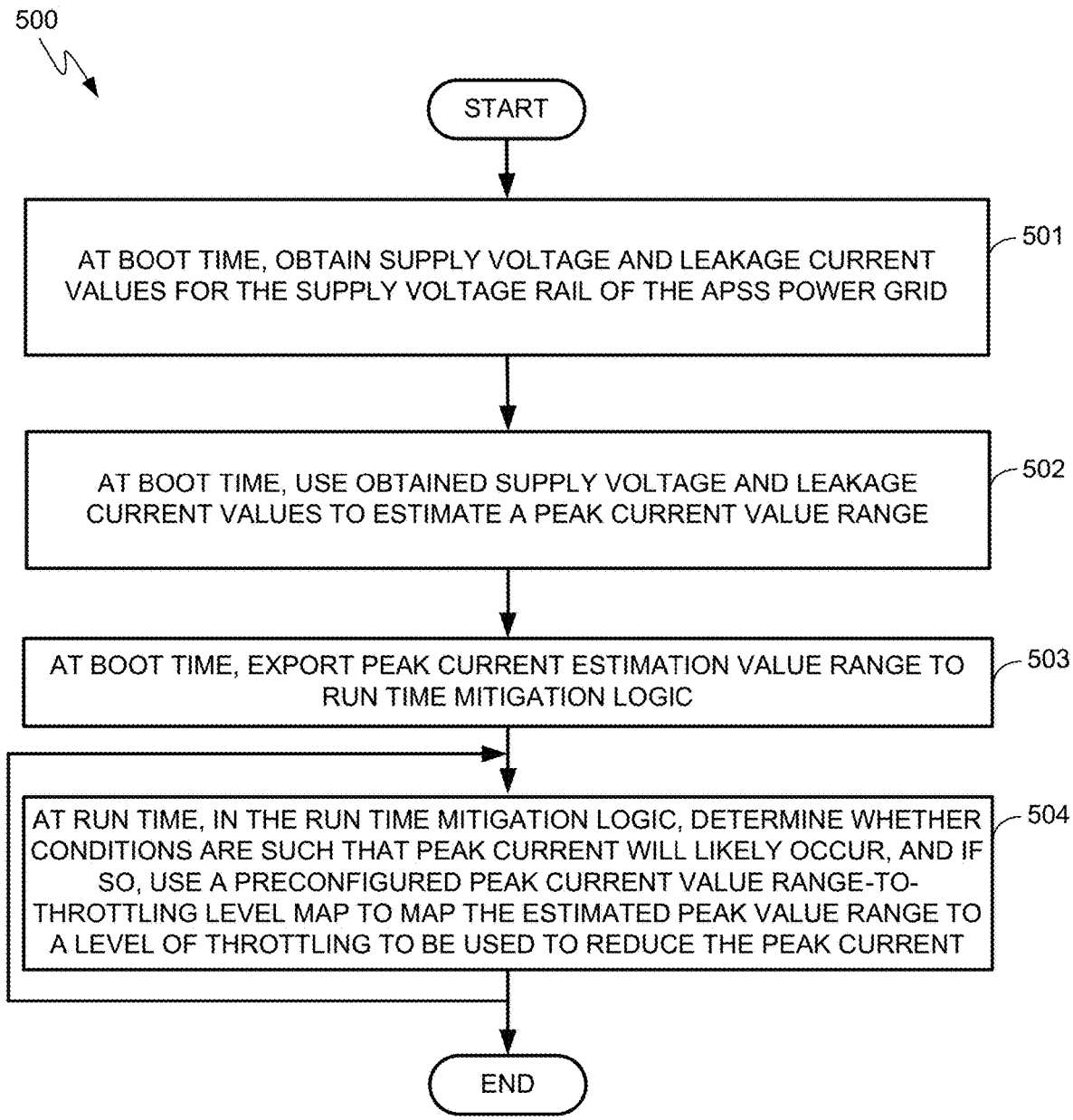
FIG. 5 is a flow diagram of the process performed by the APSS controller shown in FIG. 1 in accordance with a representative embodiment to estimate peak current at boot time by using the equation(s) described with reference to FIG. 3, to select a level of throttling that is to be performed at run time based on the peak current estimate, and to perform the selected level of throttling at run time if run time conditions indicate that the APSS is operating at peak current or near peak current or is likely to be operating at peak current soon (e.g., within the next few clock cycles)

FIG. 5 is a flow diagram of the process 500 performed by the APSS controller 110 in accordance with a representative embodiment to estimate peak current at boot time by using the equation(s) described above with reference to FIG. 3, to select a level of throttling that is to be performed at run time based on the peak current estimate, and to perform the selected level of throttling at run time if run time conditions indicate that the APSS 100 is operating at peak current or near peak current or is likely to be operating at peak current soon (e.g., within the next few clock cycles). Block 501 represents the process performed by the boot time voltage and leakage current obtention logic 201 of FIG. 2 of obtaining supply voltage and leakage current values at boot time. As indicated above, the leakage current can be obtained at boot time by reading a register value in which the leakage current value has been fused, or programmed, whereas the supply voltage will typically be measured or sensed at boot time. It should be noted that the process of obtaining the leakage current does not require the use of a current sensor and that the inventive principles and concepts can be performed in an SoC that does not include current sensors, which add to the cost and use additional area of the SoC.

Block 502 represents the process performed by the boot peak time current estimation logic 202 of FIG. 2 of using these values obtained at boot time in the equation(s) discussed above (e.g., Equations 1-3) to generate the estimated peak current value range by comparing the sum on the left side of the equation with the corresponding TH value to determine which region of the plot 300 (FIG. 3) the peak current range is in at boot time.

Block 503 represents the process exporting the estimated peak current value range to the run time mitigation logic 205. Block 504 represents the process performed by the run time mitigation performance logic 204 of determining at run time whether conditions indicate that it is likely that peak current is occurring or will occur, and if so, performing the selected level of throttling to reduce peak current by using the aforementioned LuT to map results of the equation(s) to preselected throttling levels contained at addresses in the LuT. The process represented by block 504 can be repeated until the APSS 100 shuts down or is rebooted.

Figure 6:
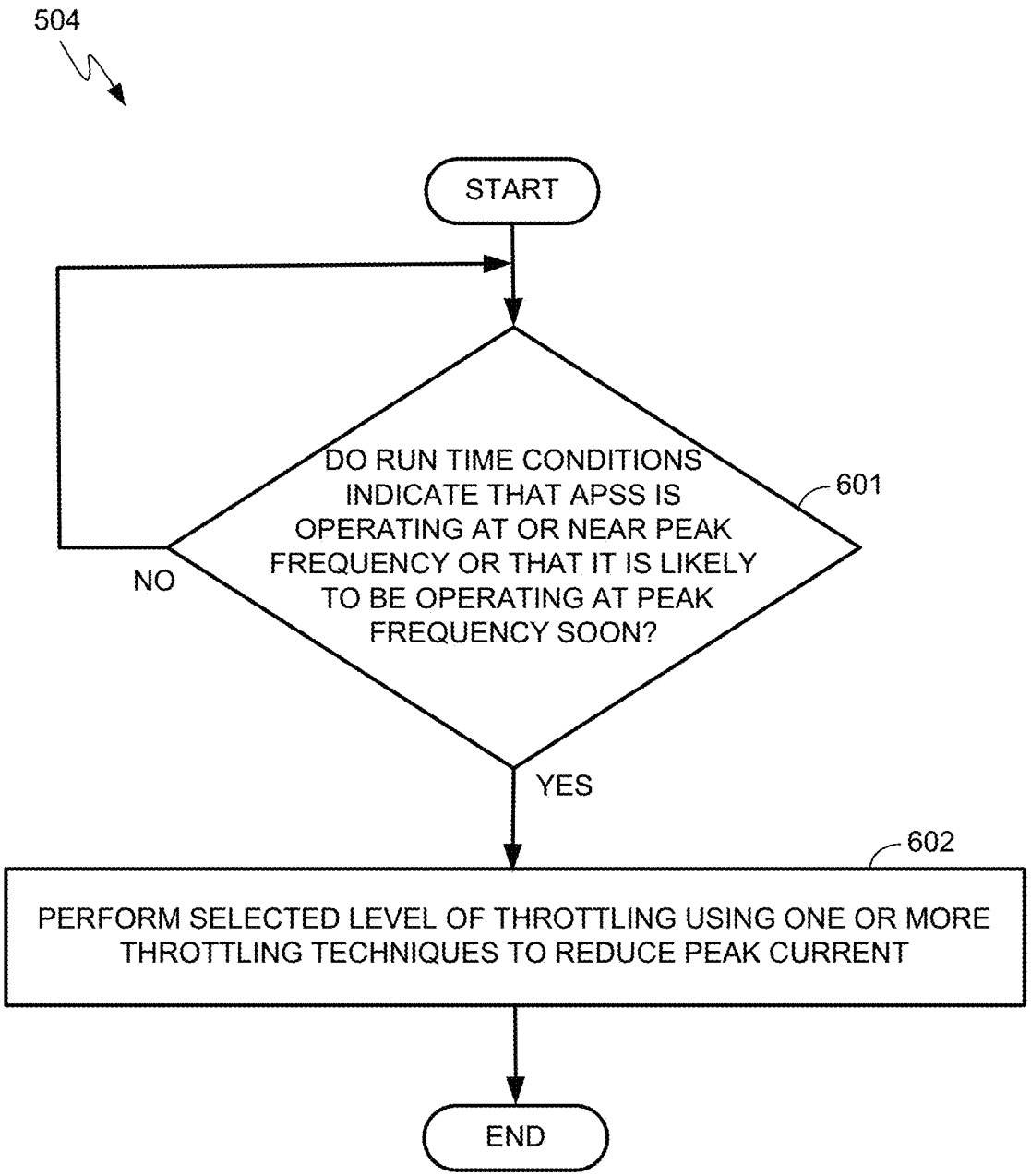
FIG. 6 is a flow diagram of the process represented by block 504 of FIG. 5 in accordance with a representative embodiment.

FIG. 6 is a flow diagram of the process represented by block 504 of FIG. 5 in accordance with a representative embodiment. When the run time mitigation enabling logic 203 of FIG. 2 enables the run time mitigation performance logic 204 of FIG. 2, logic 204 determines whether run time conditions indicate that the APSS 100 is operating at or near peak frequency or is likely to start operating at peak frequency soon (e.g., within a few clock cycles), as indicated by block 601. If not, the process represented by block 601 can repeat until a determination is made at block 601 that the conditions have been met or until the APSS 100 shuts down or is rebooted. These conditions that should be met to move from block 601 to block 602 are normally: (1) all cores of all of the processors $102_1$-$102_M$ of all of the clusters $101_1$-$101_N$ are active; (2) all of the processors $102_1$-$102_M$ of all of the clusters $101_1$-$101_N$ are operating at their maximum operating at their maximum clock frequencies; and (3) the junction temperature, TJ, is greater than some temperature TH value, $TH_{Temp}$, e.g., 85° C. The junction temperature TJ is typically sensed at or near the one or more of the cluster processors $102_1$-$102_M$ of the clusters $101_1$-$101_N$. The inventive principles and concepts are not limited to all of these conditions (1)-(3) always having to be met before mitigation steps are taken, but mitigation generally will not be needed unless all of these conditions are met.

When the process moves from block 601 to block 602, the run time mitigation logic 205 of FIG. 2 maps the peak current value range to the corresponding level of throttling and performs that level of throttling to reduce peak current.

As indicated above, existing throttling approaches used for reducing peak current include frequency throttling to reduce the operating frequency of the processors or by performing microarchitectural throttling to reduce the number of instructions that are executed per clock cycle by one or more of the processors. Any other throttling techniques that are suitable for power management can also be used for this purpose. Any of the throttling techniques can be used alone or in combination with one or more of the other throttling techniques.

One of the advantages of the systems and methods of the present disclosure is that throttling is specific to the part, i.e., to the particular SoC, in that the throttling levels that are applied are based in large part on the voltage and leakage current values obtained when the specific SoC is booted up. This is in contrast to existing approaches that use maximum power mitigation mechanism (MPMMs) that perform static throttling, i.e., throttling that uses the same TH values for applying the same throttling levels for all SoCs of the same design. Such mitigation solutions typically lead to a 3 to 5% detrimental impact on performance across 100% of the SoCs of the particular design or model.

Because the approach of the present disclosure selects throttling levels based on an estimated peak current that is based at least in part on voltage and leakage current values obtained at boot time, the throttling level that is applied is more suitable. This leads to a performance improvement in that throttling has less of a detrimental impact on performance. For the example SoC discussed above with reference to FIG. 3, 0% performance impact was observed for peak current values ranging from less than 9.0 A and up to 9.5 A, a relatively small performance impact of less than 1% was observed for fewer than 1% of the SoCs for peak current values ranging from 9.5 A to 10.0 A, and a relatively small performance impact of 1 to 1.5% was observed for fewer than 0.5% of the SoCs for peak current values ranging from 10.0 A to 10.5 A. Thus, in all cases, the performance impact was very small and only affected a very small number of the SoCs. A significant volume of the SoCs will have unthrottled performance because the run time mitigation enabling logic 203 will remain disabled in those SoCs. Yet another benefit is that because no current sensor is needed for measuring peak current, per unit cost of the SoC is reduced.

A post-production process can be performed to fine tune the throttle level values that are stored in the LuT. The LuT, which is typically internal to the APSS controller 110, can be updated at any time with firmware running on the APSS controller 110. Peak current measurements can be taken of the peak current flowing in the power grid rail and compared to the peak current value range estimate to correlate the estimate with the measured value. To the extent that the estimate does not correlate well with the measurement, the LuT values can be tuned until the aforementioned equation(s) produce the same results for the measured and estimated peak current value ranges. This post-production process can also include analyzing peak current mitigation versus performance to determine the impact on overall performance, stability and boot time key performance indicators (KPIs). Based on that analysis, the values of the LuT can also be fine-tuned.

Figure 7:
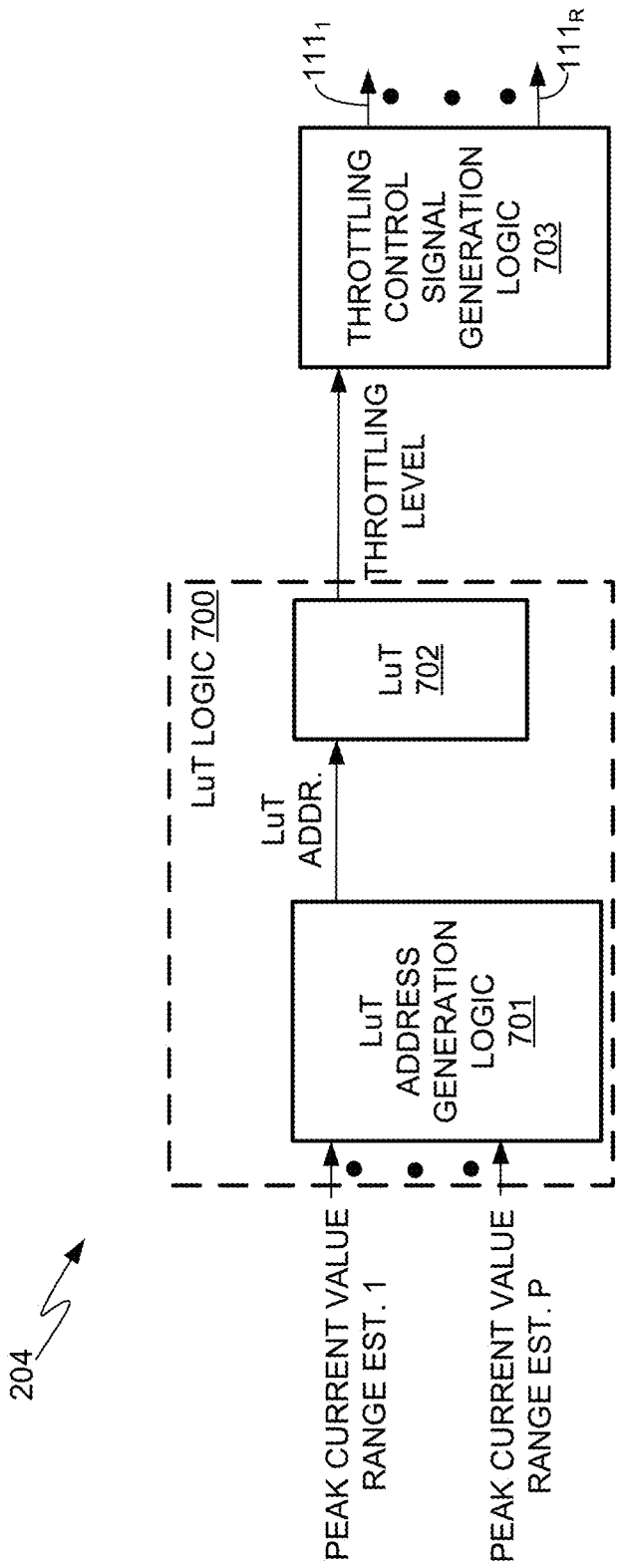
FIG. 7 illustrates a block diagram of the run time mitigation performing logic 204 shown in FIG. 2 that demonstrates the manner in which the peak current estimate value-to-throttling level mapping is performed in accordance with a representative embodiment.

FIG. 7 illustrates a block diagram of the run time mitigation performing logic 204 shown in FIG. 2 that demonstrates the manner in which the peak current estimate value range-to-throttling level mapping is performed in accordance with a representative embodiment. P peak current estimates that are made using equations identical or similar to Equations 1-3 are received by LuT logic 700, where P is a positive integer that is greater than or equal to one and typically is greater than or equal to two. The greater the value of P, the greater number of throttling levels that can be used for different ranges of peak current estimates. LuT address generation logic 701 of the LuT logic 700 converts each peak current value range estimate into a respective LuT address, which is then received by the LuT 702. The LuT 702 outputs the corresponding throttling level stored at the received LuT address. The throttling level is received by throttling control signal generation logic 703, which generates the corresponding control signals $111_1$-$111_R$ shown in FIG. 1 that are delivered to the cluster processors $102_1$-$102_M$ of clusters $101_1$-$101_N$ to cause them to perform throttling at the corresponding throttling level.

For example, assuming Equations 1-3 are used to estimate whether the peak current range is (1) 0 to 9.0 mA, (2) greater than 9.0 mA, but less than 9.5 mA, (3) greater than 9.5 mA, but less than 10.0 mA, or (4) greater than 10.0 mA. The LuT address generation logic 701 can convert range (1) into address 0,0 in LuT 702, range (2) into address 0,1 in LuT 702, range (3) into address 1,0 in LuT 702, and range (4) into address 1.1 in LuT 702. Each of these addresses would contain a value corresponding to the level of throttling to be used for each respective estimated peak current value range.

Figure 8:
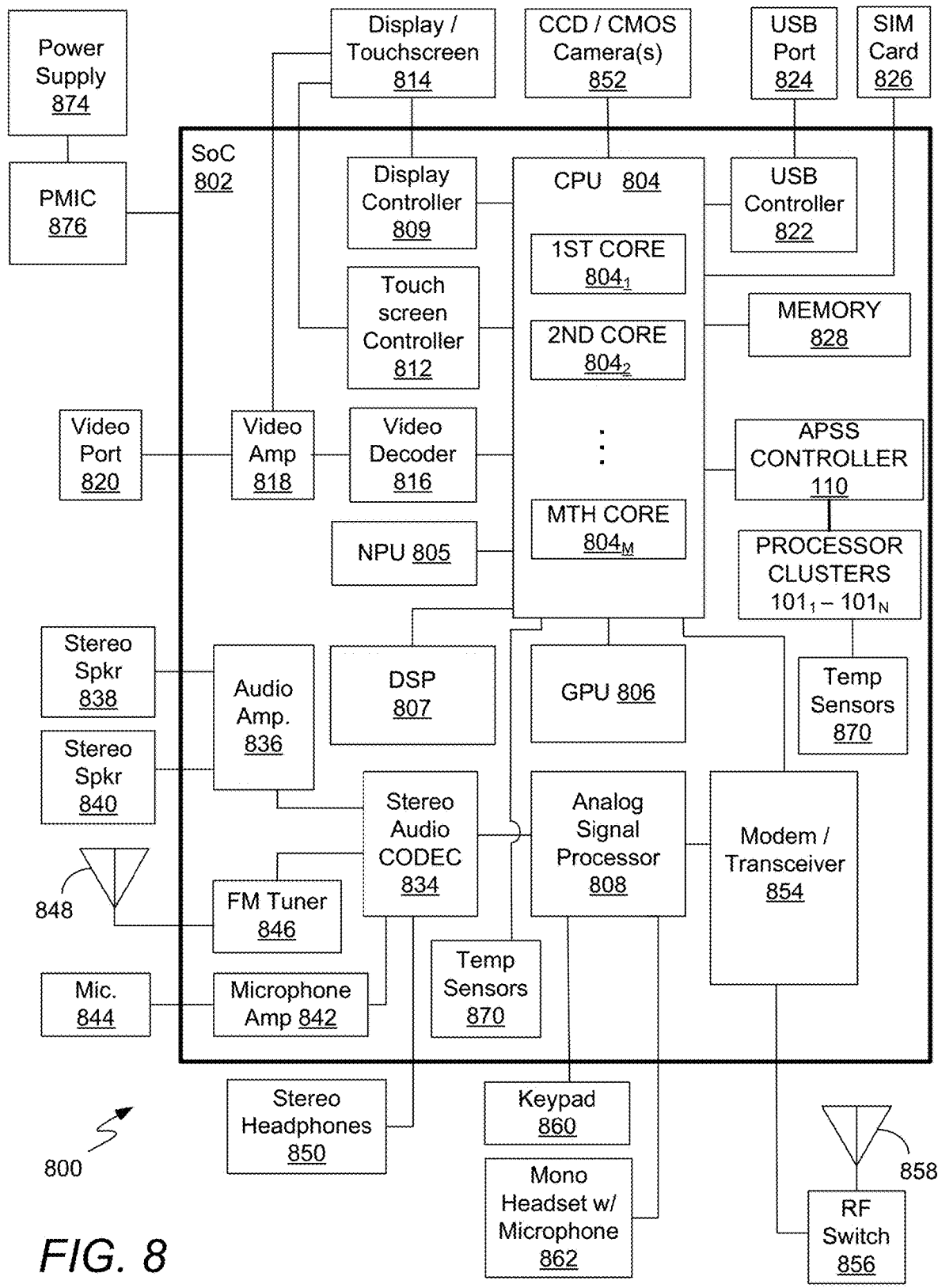
FIG. 8 illustrates an example of a PCD in which exemplary embodiments of systems, methods, computer-readable media, and other examples of providing the mitigation solution according to the inventive principles and concepts may be implemented.

FIG. 8 illustrates an example of a PCD 800, such as a mobile phone, a smartphone, a portable game console such as an Extended Reality (XR) device, a Virtual Reality (VR) device, an Augmented Reality (AR) device, or a Mixed Reality (MR) device, an automotive autonomous driving system, a server chip, etc., in which exemplary embodiments of systems, methods, computer-readable media, and other examples of providing the mitigation solution according to the inventive principles and concepts may be implemented. For purposes of clarity, some interconnects, signals, etc., are not shown in FIG. 8.

The PCD 800 may include an SoC 802. The SoC 802 may include a CPU 804, an NPU 805, a GPU 806, a DSP 807, an analog signal processor 808, a modem/modem subsystem 854, or other processors. The CPU 804 may include one or more CPU cores, such as a first CPU core $804_1$, a second CPU core $804_2$, etc., through an $M^{th}$ CPU core $804_M$. The APSS 110 and the processor clusters $101_1$-$101_N$ shown in FIG. 1 are shown in FIG. 8 as being separate from the CPU 804, but the CPU 804 may be a processor of one of the processor clusters $101_1$-$101_N$. Also, the APSS controller 110 can comprise logic that is implemented in, for example, the CPU 804, the NPU 805, the GPU 806 or the DSP 807.

A display controller 809 and a touch-screen controller 812 may be coupled to the CPU 804. A touchscreen display 814 external to the SoC 802 may be coupled to the display controller 810 and the touch-screen controller 812. The PCD 800 may further include a video decoder 816 coupled to the CPU 804. A video amplifier 818 may be coupled to the video decoder 816 and the touchscreen display 814. A video port 820 may be coupled to the video amplifier 818. A universal serial bus ("USB") controller 822 may also be coupled to CPU 804, and a USB port 824 may be coupled to the USB controller 822. A subscriber identity module ("SIM") card 826 may also be coupled to the CPU 804.

One or more memories 828 may be coupled to the CPU 804 and to the APSS controller 110. The one or more memories 804 may include both volatile and non-volatile memories. Examples of volatile memories include static random access memory ("SRAM") and dynamic random access memory ("DRAM"). Such memories may be external to the SoC 802 or internal to the SoC 802. The one or more memories 828 may include local cache memory such as level 1 (L1)-level 3 (L3) cache memories and/or a system-level cache memory such as last level cache (LLC) memory.

A stereo audio CODEC 834 may be coupled to the analog signal processor 808. Further, an audio amplifier 836 may be coupled to the stereo audio CODEC 834. First and second stereo speakers 838 and 840, respectively, may be coupled to the audio amplifier 836. In addition, a microphone amplifier 842 may be coupled to the stereo audio CODEC 834, and a microphone 844 may be coupled to the microphone amplifier 842. A frequency modulation ("FM") radio tuner 846 may be coupled to the stereo audio CODEC 834. An FM antenna 848 may be coupled to the FM radio tuner 846. Further, stereo headphones 850 may be coupled to the stereo audio CODEC 834. Examples of other devices that may be coupled to the CPU 804 include one or more digital (e.g., CCD or CMOS) cameras 852.

A modem or RF transceiver 854 may be coupled to the analog signal processor 808 and the CPU 804. An RF switch 856 may be coupled to the RF transceiver 854 and an RF antenna 858. In addition, a keypad 860 and a mono headset with a microphone 862 may be coupled to the analog signal processor 808. The SoC 802 can have one or more internal or on-chip thermal sensors 870. A power supply 874 and a PMIC 876 may supply power to the SoC 802.

Firmware or software for performing the methods described above may be stored in any of the above-described memories, or may be stored in a local memory directly accessible by the APSS controller 110. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Implementation examples are described in the following numbered clauses.

1. A method for performing peak current mitigation in an application program subsystem (APSS) comprising:
   at boot time of the APSS, obtaining voltage and leakage current values of a power grid rail to which the APSS is electrically coupled, using the obtained voltage and leakage current values to estimate a peak current value of the APSS, and using a preconfigured estimated peak current value range-to-throttling level map to map the estimated peak current value range to a throttling level to be performed; and
   at run time of the APSS, if conditions indicate that the APSS is operating at or near peak current, causing the mapped throttling level to be applied to at least one processor of the APSS.
2. The method of clause 1, wherein the APSS comprises multiple clusters of processors, each cluster comprising multiple processors, and wherein the method further comprises:
   at run time of the APSS, if conditions indicate that the APSS is operating at or near peak current, causing the mapped throttling level to be applied to all of the processors of the APSS.
3. The method of any of clauses 1 and 2, wherein the mapped throttling level is applied by performing at least one of (1) reducing an operating frequency of said at least one processor and (2) reducing the number of instructions that are performed by said at least one processor during a clock cycle of said at least one processor or during a sequence of clock cycles of said at least one processor.
4. The method of any of clauses 1-3, wherein the preconfigured estimated peak current value range-to-throttling level map is implemented in lookup table (LuT) logic comprising LuT address generation logic and a LuT, the LuT address generation logic being configured to convert the estimated peak current value range into a memory address in the LuT, the LuT having a plurality of memory addresses, each memory address having a respective throttling level stored therein, each respective throttling level corresponding to a respective estimated peak current value range or estimated range of peak current values.
5. The method of any of clauses 1-4, wherein the conditions include at least one of (1) each processor is operating at a maximum clock frequency, (2) every processing core of each processor is active, and (3) a junction temperature of the APSS exceeds a preselected junction temperature threshold value.
6. The method of clauses 1-4, wherein the conditions include (1) each processor is operating at a maximum clock frequency, (2) every processing core of each processor is active, and (3) a junction temperature of the APSS exceeds a preselected junction temperature threshold value.
7. An application processing subsystem (APSS) configured to perform peak current mitigation, the APSS comprising:
   at least one processor; and
   an APSS controller comprising:
      boot time voltage and leakage current obtention logic configured to obtain, at boot time of the APSS, voltage and leakage current values of a power grid rail to which the APSS is electrically coupled;
      boot time peak current estimation logic configured to use the obtained voltage and leakage current values at boot time of the APSS to estimate a peak current value range of the APSS and to use a preconfigured estimated peak current value range-to-throttling level map to map the estimated peak current value range to a throttling level to be performed; and
      run time mitigation logic configured to cause the mapped throttling level to be applied to said at least one processor of the APSS if conditions indicate that the APSS is operating at or near peak current.
8. The APSS of clause 7, wherein said at least one processor comprises multiple clusters of processors, each cluster comprising multiple processors, and wherein the run time mitigation logic is configured to cause the mapped throttling level to be applied to all of the processors of the APSS if conditions indicate that the APSS is operating at or near peak current.
9. The APSS of any of clauses 7-8, wherein the mapped throttling level is applied by performing at least one of (1) reducing an operating frequency of said at least one processor and (2) reducing the number of instructions that are performed by said at least one processor during a clock cycle of said at least one processor or during a sequence of clock cycles of said at least one processor.
10. The APSS of any of clauses 7-9, wherein the boot time peak estimation logic comprises lookup table (LuT) logic preconfigured to implement estimated peak current value range-to-throttling level map, the LuT logic comprising LuT address generation logic and a LuT, the LuT address generation logic being configured to convert the estimated peak current value range into a memory address in the LuT, the LuT having a plurality of memory addresses, each memory address having a respective throttling level stored therein, each respective throttling level corresponding to a respective estimated peak current value or estimated range of peak current values.
11. The APSS of any of clauses 7-10, wherein the conditions include at least one of (1) each processor is operating at a maximum clock frequency, (2) every processing core of each processor is active, and (3) a junction temperature of the APSS exceeds a preselected junction temperature threshold value.
12. The APSS of any of clauses 7-10, wherein the conditions include (1) each processor is operating at a maximum clock frequency, (2) every processing core of each processor is active, and (3) a junction temperature of the APSS exceeds a preselected junction temperature threshold value.

13. The APSS of any of clauses 7-12, wherein the APSS is implemented in a system-on-a-chip (SoC) integrated circuit (IC) package.
14. The APSS of clause 13, wherein the SoC IC package is implemented in a portable computing device (PCD).
15. A non-transitory computer-readable medium comprising computer instructions for execution by an application program subsystem (APSS) for performing peak current mitigation in the APSS, the computer instructions comprising:
a first set of computer instructions for execution at boot time of the APSS for obtaining voltage and leakage current values of a power grid rail to which the APSS is electrically coupled;
a second set of computer instructions for execution at boot time of the APSS using the obtained voltage and leakage current values to estimate a peak current value range of the APSS;
a third set of computer instructions for execution at boot time of the APSS for using a preconfigured estimated peak current value range-to-throttling level map to map the estimated peak current value range to a throttling level to be performed; and
a fourth set of computer instructions for execution at run time of the APSS if conditions indicate that the APSS is operating at or near peak current, wherein execution of the fourth set of computer instructions causes the mapped throttling level to be applied to at least one processor of the APSS.
16. The non-transitory computer-readable medium of clause 15, wherein the APSS comprises multiple clusters of processors, each cluster comprising multiple processors, and wherein the fourth set of computer instructions includes computer instructions for execution at run time that cause the mapped throttling level to be applied all of the processors of the APSS if conditions at run time indicate that the APSS is operating at or near peak current.
17. The non-transitory computer-readable medium of any of clauses 15-16, wherein the fourth set of computer instructions causes the mapped throttling level to be applied by performing at least one of (1) reducing an operating frequency of said at least one processor and (2) reducing the number of instructions that are performed by said at least one processor during a clock cycle of said at least one processor or during a sequence of clock cycles of said at least one processor.
18. The non-transitory computer-readable medium of clauses 15-17, wherein the preconfigured estimated peak current value range-to-throttling level map is implemented in lookup table (LuT) logic comprising LuT address generation logic and a LuT, the LuT address generation logic being configured to convert the estimated peak current value range into a memory address in the LuT, the LuT having a plurality of memory addresses, each memory address having a respective throttling level stored therein, each respective throttling level corresponding to a respective estimated peak current value range.
19. The non-transitory computer-readable medium of any of clauses 15-18, wherein the conditions include at least one of (1) each processor is operating at a maximum clock frequency, (2) every processing core of each processor is active, and (3) a junction temperature of the APSS exceeds a preselected junction temperature threshold value.
20. The non-transitory computer-readable medium of any of clauses 15-18, wherein the conditions include (1) each processor is operating at a maximum clock frequency, (2) every processing core of each processor is active, and (3) a junction temperature of the APSS exceeds a preselected junction temperature threshold value.
21. The non-transitory computer-readable medium of clauses 15-20, wherein the non-transitory computer-readable medium comprises a memory device of a system-on-a-chip (SoC) integrated circuit (IC) package, the memory device being one of internal to APSS and external to, and accessible by, the APSS.
22. The non-transitory computer-readable medium of clause 21, wherein the SoC IC package is employed in a portable computing device (PCD).
23. An application program subsystem (APSS) for performing peak current mitigation, the APSS comprising:
at least one processor; and
an APSS controller comprising:
  means for obtaining, at boot time of the APSS, voltage and leakage current values of a power grid rail to which the APSS is electrically coupled;
  means for using, at boot time, the obtained voltage and leakage current values at boot time of the APSS to estimate a peak current value range of the APSS;
  means for using, at boot time, a preconfigured estimated peak current value range-to-throttling level map to map the estimated peak current value range to a throttling level to be performed; and
  means for causing, at run time, the mapped throttling level to be applied to said at least one processor of the APSS if conditions indicate that the APSS is operating at or near peak current.
24. The APSS of clause 23, wherein said at least one processor comprises multiple clusters of processors, each cluster comprising multiple processors, and wherein said means for causing causes the mapped throttling level to be applied to all of the processors of the APSS if conditions indicate that the APSS is operating at or near peak current.
25. The APSS of any of clauses 23-24, wherein the mapped throttling level is applied by performing at least one of (1) reducing an operating frequency of said at least one processor and (2) reducing the number of instructions that are performed by said at least one processor during a clock cycle of said at least one processor or during a sequence of clock cycles of said at least one processor.
26. The APSS of any of clauses 23-25, wherein the preconfigured estimated peak current value range-to-throttling level map is implemented with lookup table (LuT) logic comprising LuT address generation logic and a LuT, the LuT address generation logic being configured to convert the estimated peak current value range into a memory address in the LuT, the LuT having a plurality of memory addresses, each memory address having a respective throttling level stored therein, each respective throttling level corresponding to a respective estimated peak current value range.
27. The APSS of any of clauses 23-26, wherein the conditions include at least one of (1) each processor is operating at a maximum clock frequency, (2) every processing core of each processor is active, and (3) a junction temperature of the APSS exceeds a preselected junction temperature threshold value.

28. The APSS of any of clauses 23-26, wherein the conditions include (1) each processor is operating at a maximum clock frequency, (2) every processing core of each processor is active, and (3) a junction temperature of the APSS exceeds a preselected junction temperature threshold value.

29. The APSS of any of clauses 23-28, wherein the APSS is implemented in a system-on-a-chip (SoC) integrated circuit (IC) package.

30. The APSS of clause 29, wherein the SoC IC package is implemented in a portable computing device (PCD).

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for performing peak current mitigation in an application program subsystem (APSS) comprising:
   at boot time of the APSS, obtaining voltage and leakage current values of a power grid rail to which the APSS is electrically coupled;
   using the obtained voltage and leakage current values to estimate a peak current value range of the APSS, where the estimated peak current value range of the APSS is determined from at least one equation (Eq. 1) comprising:

$$\text{APSS\_Voltage (Volts)} + k_1 * \frac{\text{Part leakage (mA)}}{\text{Design leakage estimate (mA)}} < TH_1 \quad \text{Eq. 1}$$

where APSS_voltage (Volts) is the obtained voltage in Volts, Part leakage (mA) is the obtained leakage current in milliamps (mA), $k_1$ is a first constant derived from a plot of peak current as a function of supply voltage and a ratio of actual leakage current to a leakage current obtained by modeling a system-on-chip (SoC) design, Design leakage estimate (mA) is the leakage current of a power grid in milliamps (mA) estimated using the model of the SoC design, and $TH_1$ is a first threshold (TH) value also derived from the plot of peak current as a function of supply voltage and the ratio of actual leakage current to the leakage current obtained by using the model of the SoC design;
   using a preconfigured estimated peak current value range-to-throttling level map to map the estimated peak current value range to a throttling level to be performed; and
   at run time of the APSS, if conditions indicate that the APSS is operating at or near peak current, causing the mapped throttling level to be applied to at least one processor of the APSS.

2. The method of claim 1, wherein the APSS comprises multiple clusters of processors, each cluster comprising multiple processors, and wherein the method further comprises:
   at run time of the APSS, if conditions indicate that the APSS is operating at or near peak current, causing the mapped throttling level to be applied all of the processors of the APSS.

3. The method of claim 2, wherein the conditions include at least one of (1) each processor is operating at a maximum clock frequency, (2) every processing core of each processor is active, and (3) a junction temperature of the APSS exceeds a preselected junction temperature threshold value.

4. The method of claim 2, wherein the conditions include (1) each processor is operating at a maximum clock frequency, (2) every processing core of each processor is active, and (3) a junction temperature of the APSS exceeds a preselected junction temperature threshold value.

5. The method of claim 1, wherein the mapped throttling level is applied by performing at least one of (1) reducing an operating frequency of said at least one processor and (2) reducing the number of instructions that are performed by said at least one processor during a clock cycle of said at least one processor or during a sequence of clock cycles of said at least one processor.

6. The method of claim 1, wherein the preconfigured estimated peak current value range-to-throttling level map is implemented in lookup table (LuT) logic comprising LuT address generation logic and a LuT, the LuT address generation logic being configured to convert the estimated peak current value range into a memory address in the LuT, the LuT having a plurality of memory addresses, each memory address having a respective throttling level stored therein, each respective throttling level corresponding to a respective estimated peak current value range.

7. An application processing subsystem (APSS) configured to perform peak current mitigation, the APSS comprising:
   at least one processor; and
   an APSS controller comprising:
      boot time voltage and leakage current obtention logic configured to obtain, at boot time of the APSS, voltage and leakage current values of a power grid rail to which the APSS is electrically coupled;
      boot time peak current estimation logic configured to use the obtained voltage and leakage current values at boot time of the APSS to estimate a peak current value range of the APSS and to use a preconfigured estimated peak current value range-to-throttling level map to map the estimated peak current value range to a throttling level to be performed,
   where the estimated peak current value range of the APSS is determined from at least one equation (Eq. 1) comprising:

$$\text{APSS\_Voltage (Volts)} + k_1 * \frac{\text{Part leakage (mA)}}{\text{Design leakage estimate (mA)}} < TH_1 \quad \text{Eq. 1}$$

where APSS_voltage (Volts) is the obtained voltage in Volts, Part leakage (mA) is the obtained leakage current in milliamps (mA), $k_1$ is a first constant derived from a plot of peak current as a function of supply voltage and a ratio of actual leakage current to a leakage current obtained by modeling a system-on-chip (SoC) design, Design leakage estimate (mA) is the leakage current of a power grid in milliamps (mA) estimated using the model of the SoC design, and $TH_1$ is a first threshold (TH) value also derived from the plot of peak current as a function of supply voltage and the ratio of actual leakage current to the leakage current obtained by using the model of the SoC design; and
   run time mitigation logic configured to cause the mapped throttling level to be applied to said at least one processor of the APSS if conditions indicate that the APSS is operating at or near peak current.

8. The APSS of claim 7, wherein said at least one processor comprises multiple clusters of processors, each cluster comprising multiple processors, and wherein the run time mitigation logic is configured to cause the mapped throttling level to be applied to all of the processors of the APSS if conditions indicate that the APSS is operating at or near peak current.

9. The APSS of claim 8, wherein the conditions include at least one of (1) each processor is operating at a maximum clock frequency, (2) every processing core of each processor is active, and (3) a junction temperature of the APSS exceeds a preselected junction temperature threshold value.

10. The APSS of claim 8, wherein the conditions include (1) each processor is operating at a maximum clock frequency, (2) every processing core of each processor is active, and (3) a junction temperature of the APSS exceeds a preselected junction temperature threshold value.

11. The APSS of claim 7, wherein the mapped throttling level is applied by performing at least one of (1) reducing an operating frequency of said at least one processor and (2) reducing the number of instructions that are performed by said at least one processor during a clock cycle of said at least one processor or during a sequence of clock cycles of said at least one processor.

12. The APSS of claim 7, wherein the boot time peak estimation logic comprises lookup table (LuT) logic preconfigured to implement estimated peak current value range-to-throttling level map, the LuT logic comprising LuT address generation logic and a LuT, the LuT address generation logic being configured to convert the estimated peak current value range into a memory address in the LuT, the LuT having a plurality of memory addresses, each memory address having a respective throttling level stored therein, each respective throttling level corresponding to a respective estimated peak current value range.

13. The APSS of claim 7, wherein the APSS is implemented in a system-on-a-chip (SoC) integrated circuit (IC) package.

14. The APSS of claim 13, wherein the SoC IC package is implemented in a portable computing device (PCD).

15. A non-transitory computer-readable medium comprising computer instructions for execution by an application program subsystem (APSS) for performing peak current mitigation in the APSS, the computer instructions comprising:
a first set of computer instructions for execution at boot time of the APSS for obtaining voltage and leakage current values of a power grid rail to which the APSS is electrically coupled;
a second set of computer instructions for execution at boot time of the APSS using the obtained voltage and leakage current values to estimate a peak current value range of the APSS;
where the estimated peak current value range of the APSS is determined from at least one equation (Eq. 1) comprising:

$$\text{APSS\_Voltage (Volts)} + k_1 * \frac{\text{Part leakage (mA)}}{\text{Design leakage estimate (mA)}} < TH_1 \quad \text{Eq. 1}$$

where APSS_voltage (Volts) is the obtained voltage in Volts, Part leakage (mA) is the obtained leakage current in milliamps (mA), $k_1$ is a first constant derived from a plot of peak current as a function of supply voltage and a ratio of actual leakage current to a leakage current obtained by modeling a system-on-chip (SoC) design, Design leakage estimate (mA) is the leakage current of a power grid in milliamps (mA) estimated using the model of the SoC design, and $TH_1$ is a first threshold (TH) value also derived from the plot of peak current as a function of supply voltage and the ratio of actual leakage current to the leakage current obtained by using the model of the SoC design;
a third set of computer instructions for execution at boot time of the APSS for using a preconfigured estimated peak current value range-to-throttling level map to map the estimated peak current value range to a throttling level to be performed; and
a fourth set of computer instructions for execution at run time of the APSS if conditions indicate that the APSS is operating at or near peak current, wherein execution of the fourth set of computer instructions causes the mapped throttling level to be applied to at least one processor of the APSS.

16. The non-transitory computer-readable medium of claim 15, wherein the APSS comprises multiple clusters of processors, each cluster comprising multiple processors, and wherein the fourth set of computer instructions includes computer instructions for execution at run time that cause the mapped throttling level to be applied all of the processors of the APSS if conditions at run time indicate that the APSS is operating at or near peak current.

17. The non-transitory computer-readable medium of claim 16, wherein the conditions include at least one of (1) each processor is operating at a maximum clock frequency, (2) every processing core of each processor is active, and (3) a junction temperature of the APSS exceeds a preselected junction temperature threshold value.

18. The non-transitory computer-readable medium of claim 16, wherein the conditions include (1) each processor is operating at a maximum clock frequency, (2) every processing core of each processor is active, and (3) a junction temperature of the APSS exceeds a preselected junction temperature threshold value.

19. The non-transitory computer-readable medium of claim 15, wherein the fourth set of computer instructions causes the mapped throttling level to be applied by performing at least one of (1) reducing an operating frequency of said at least one processor and (2) reducing the number of instructions that are performed by said at least one processor during a clock cycle of said at least one processor or during a sequence of clock cycles of said at least one processor.

20. The non-transitory computer-readable medium of claim 15, wherein the preconfigured estimated peak current value range-to-throttling level map is implemented in lookup table (LuT) logic comprising LuT address generation logic and a LuT, the LuT address generation logic being configured to convert the estimated peak current value range into a memory address in the LuT, the LuT having a plurality of memory addresses, each memory address having a respective throttling level stored therein, each respective throttling level corresponding to a respective estimated peak current value range.

21. The non-transitory computer-readable medium of claim 15, wherein the non-transitory computer-readable medium comprises a memory device of a system-on-a-chip (SoC) integrated circuit (IC) package, the memory device being one of internal to APSS and external to, and accessible by, the APSS.

22. The non-transitory computer-readable medium of claim 21, wherein the SoC IC package is employed in a portable computing device (PCD).

23. An application program subsystem (APSS) for performing peak current mitigation, the APSS comprising:
   at least one processor; and
   an APSS controller comprising:
   means for obtaining, at boot time of the APSS, voltage and leakage current values of a power grid rail to which the APSS is electrically coupled;
   means for using, at boot time, the obtained voltage and leakage current values at boot time of the APSS to estimate a peak current value range of the APSS;
   where the estimated peak current value range of the APSS is determined from at least one equation (Eq. 1) comprising:

$$\text{APSS\_Voltage (Volts)} + k_1^* \frac{\text{Part leakage (mA)}}{\text{Design leakage estimate(mA)}} < TH_1 \quad \text{Eq. 1}$$

where APSS_voltage (Volts) is the obtained voltage in Volts, Part leakage (mA) is the obtained leakage current in milliamps (mA), $k_1$ is a first constant derived from a plot of peak current as a function of supply voltage and a ratio of actual leakage current to a leakage current obtained by modeling a system-on-chip (SoC) design, Design leakage estimate (mA) is the leakage current of a power grid in milliamps (mA) estimated using the model of the SoC design, and $TH_1$ is a first threshold (TH) value also derived from the plot of peak current as a function of supply voltage and the ratio of actual leakage current to the leakage current obtained by using the model of the SoC design;
   means for using, at boot time, a preconfigured estimated peak current value range-to-throttling level map to map the estimated peak current value range to a throttling level to be performed; and
   means for causing, at run time, the mapped throttling level to be applied to said at least one processor of the APSS if conditions indicate that the APSS is operating at or near peak current.

24. The APSS of claim 23, wherein said at least one processor comprises multiple clusters of processors, each cluster comprising multiple processors, and wherein said means for causing causes the mapped throttling level to be applied to all of the processors of the APSS if conditions indicate that the APSS is operating at or near peak current.

25. The APSS of claim 24, wherein the conditions include at least one of (1) each processor is operating at a maximum clock frequency, (2) every processing core of each processor is active, and (3) a junction temperature of the APSS exceeds a preselected junction temperature threshold value.

26. The APSS of claim 24, wherein the conditions include (1) each processor is operating at a maximum clock frequency, (2) every processing core of each processor is active, and (3) a junction temperature of the APSS exceeds a preselected junction temperature threshold value.

27. The APSS of claim 23, wherein the mapped throttling level is applied by performing at least one of (1) reducing an operating frequency of said at least one processor and (2) reducing the number of instructions that are performed by said at least one processor during a clock cycle of said at least one processor or during a sequence of clock cycles of said at least one processor.

28. The APSS of claim 23, wherein the preconfigured estimated peak current value range-to-throttling level map is implemented with lookup table (LuT) logic comprising LuT address generation logic and a LuT, the LuT address generation logic being configured to convert the estimated peak current value range into a memory address in the LuT, the LuT having a plurality of memory addresses, each memory address having a respective throttling level stored therein, each respective throttling level corresponding to a respective estimated peak current value range.

29. The APSS of claim 23, wherein the APSS is implemented in a system-on-a-chip (SoC) integrated circuit (IC) package.

30. The APSS of claim 29, wherein the SoC IC package is implemented in a portable computing device (PCD).

* * * * *